US006140796A

United States Patent [19]

Martin et al.

[11] Patent Number: 6,140,796

[45] Date of Patent: Oct. 31, 2000

[54] BATTERY JUMP-START SAFETY SYSTEM AND PROCESS

[75] Inventors: Kenneth Stanley Martin; Kimberly Beth Martin, both of Lake Oswego, Oreg.

[73] Assignee: Martin Safety Products Co., Lake Oswego, Oreg.

[21] Appl. No.: 09/122,514

[22] Filed: Jul. 24, 1998

Related U.S. Application Data

[60] Provisional application No. 60/055,257, Aug. 7, 1997.

[51] Int. Cl.[7] .............................. H02J 7/00; H01R 11/00

[52] U.S. Cl. .......................... 320/105; 439/503; 439/504

[58] Field of Search .................................... 439/500, 501, 439/502, 503, 504, 505, 506; 320/103, 104, 105; 40/316

[56] References Cited

U.S. PATENT DOCUMENTS

| | | | |
|---|---|---|---|
| 1,281,288 | 10/1918 | Carley . | |
| 2,914,166 | 11/1959 | Bihler . | |
| 3,456,181 | 7/1969 | Godschalk . | |
| 3,969,006 | 7/1976 | Brown | 312/234.1 |
| 4,004,362 | 1/1977 | Barbieri . | |
| 4,037,720 | 7/1977 | McGurk | 206/702 |
| 4,199,884 | 4/1980 | Loof . | |
| 4,286,172 | 8/1981 | Millonzi et al. | 320/10.1 |
| 4,414,426 | 11/1983 | Burtelson | 174/59 |
| 4,496,204 | 1/1985 | Conley . | |
| 4,649,658 | 3/1987 | Sarton et al. . | |
| 4,653,833 | 3/1987 | Czubernat et al. . | |
| 4,656,767 | 4/1987 | Tarrant . | |
| 4,721,479 | 1/1988 | Shuman | 439/503 |
| 4,784,614 | 11/1988 | Sidigh-Behzadi | 439/488 |
| 4,856,214 | 8/1989 | Machen . | |
| 4,882,116 | 11/1989 | McMillen et al. | 264/254 |
| 4,952,468 | 8/1990 | Abraham et al. | 429/175 |
| 5,149,277 | 9/1992 | LeMaster | 439/207 |
| 5,189,359 | 2/1993 | Kronberg | 320/126 |
| 5,297,977 | 3/1994 | Lamper . | |
| 5,338,224 | 8/1994 | Blanke et al. | 439/491 |
| 5,374,130 | 12/1994 | Hirono | 400/68 |
| 5,409,391 | 4/1995 | Raby | 439/239 |
| 5,419,715 | 5/1995 | Laveissiere | 439/491 |
| 5,537,752 | 7/1996 | Cornwell et al. | 33/1 SB |
| 5,658,648 | 8/1997 | Doerr et al. . | |
| 5,820,407 | 10/1998 | Morse et al. | 439/504 |

OTHER PUBLICATIONS

Martin Safety Products, "Cable Lable Home Page", members.aol.com/cablelable, Oct. 1999.

Cable Labels—Cabel Labels Pty. Ltd., "Cabel Labels—'Keeping track of both ends'", www.cabelabels.com.au, Oct. 1999.

Bob Hewitt, "Jump–starting your battery the safe way", www.misterfixit.com/jumpstrt.htm, 1996.

Kenneth Stanley Martin, Federal Trademark Registration #2,041,354 for Instructional Safety Label for use with Battery Jumper Cables, filed Aug. 1, 1995, published for opposition Mar. 5, 1996, registered Feb. 25, 1997.

Kenneth Stanley Martin, Copyright Registration #TXU 680–950, Effective Sep. 28, 1995, for as of then non–published work Cable Lable Battery Jumper Cable Labels.

Kenneth Stanley Martin, Copyright Registration #TXU 680–967, Effective Sep. 28, 1995, for as of then non–published work for Cable Lable Instructions.

*Primary Examiner*—Peter S. Wong
*Assistant Examiner*—Gregory J. Toatley, Jr.
*Attorney, Agent, or Firm*—Dellett and Walters; Howard Russell

[57] ABSTRACT

A battery jump-start safety system and process comprising a plurality of color-coded and enumerated instructional labels and a summary label, each such label being adapted for attachment to conventional jumper cables, each such instructional label being designed to be positioned adjacent the portion of the jumper cable to be used during the process of jump-starting a dead battery. A protective bag designed for storing jumper cables and placement over a dead battery to be jump-started and comprising a pocket made of a flexible, durable material, such as leather, vinyl, or other suitable material, means for closing the pocket, and safety instructions printed on said pocket pertaining to the jump-starting of the dead battery and placement of the bag over the dead battery to be jump-started.

5 Claims, 7 Drawing Sheets

BATTERY JUMP-START SAFETY SYSTEM AND PROCESS

This application claims the benefit of U.S. Provisional Patent Application Ser. No. 60/055,257 filed Aug. 7, 1997.

BACKGROUND OF THE INVENTION

The present invention relates in general to instructions for jump-starting a battery and more particularly to a system and method of safely and effectively jump-starting a battery with jumper cables having instructional labels placed thereon.

There are a significant number of steps required to be performed, preferably in a particular order, to effectively and safely jump-start a battery, such as for example, a battery for a car, boat or other recreational vehicle. These steps can be easily forgotten over time, forgotten in an emergency situation, or perhaps not sufficiently learned and retained in the first place. Moreover, the steps for performing the jump-starting of a battery are not necessarily intuitive or easy to understand for the average person. In fact, the steps can be deceptively misleading as to how they are to be properly applied, unless express instructions are followed.

Moreover, most everyone has had the need to jump-start a dead or weakened car battery from time to time, and unfortunately, jump-starting a car battery can be a very dangerous proposition. Explosions resulting from following improper procedures upon jump-starting car and other batteries have occurred involving destruction of property, including serious damage, as for example by shorting, to a car's electrical, electronic, and computer systems, acid bums, the loss of a limb, loss of sight, disfigurement, and other injuries possibly resulting even in death. Such explosions occur most frequently upon attaching the second black-handled cable clamp to the negative post of the dead battery, instead of the safe and recommended procedure of attaching it to the frame of the car or engine away from the dead battery. Attachment of the black clamp to the negative post of the dead battery can spark battery gases causing an explosion. Moreover, if the cables are crossed upon attachment (e.g., one red clamp designed for attachment to a positive terminal is attached to the positive terminal of a dead battery, and the other red clamp designed for attachment to a positive terminal is attached to the negative terminal of a good battery) then serious electrical system damage can result to the vehicles in which the batteries reside. With the advent of modem computer technology and other sensitive electronics, this electrical system damage can be very expensive to correct. Indeed, the electrical system for that particular car may never be the same, fully functional, again.

Typically, the need to jump-start one's battery occurs away from home or office, where one might normally be expected to keep safety instructions on hand. Or perhaps the person performing the jump-start does not even appreciate the need for precaution or safety instructions to jump-start a battery. Perhaps safety instructions were obtained at an earlier time and have since been forgotten. Whatever the case may be, it is a well known fact that many attempt to jump-start their automobile batteries, or other types of batteries, without first consulting safety instructions, and for this reason, a significant number of faulty starts, damaged property, and injuries have resulted.

While sometimes jumper cables come with colored handles, there has not been included integrally with jumper cables, or made available for later attachment to jumper cables, an integrated safety system of instruction on how to use the jumper cables. Also, sometimes a pair of jumper cables are not attached in such a way as to ensure that each red handle is near a black handle. This has the unfortunate result of making more possible, or likely, the incorrect attachment of the jumper cables to their appropriate locations in the confusion that often attends jump-starting a battery.

SUMMARY OF THE INVENTION

In accordance with one aspect of the invention, a battery jump-start safety system is provided comprising instructional means, such as labels or tags, adapted for attachment to conventional jumper cables. Preferably, the labels are numbered, color-coded, and separable into a plurality of labels, one instructional step separable from another, such that each individual instructional step may be attached closely adjacent the portion of the jumper cable, that is a jumper cable clamp or attachment means, to be used for a particular step of the jump-start process. Also, preferably, the labels are made of a durable substance able to be attached durably or semi-permanently to the jumper-cables themselves. Furthermore, preferably, a summary label integrating the individual instruction step labels may be attached to the cables at a location central to the jumper cables and not necessarily closely adjacent a clamp or attachment end of the jumper cable to be used to jump-start a battery. Moreover, preferably, the labels in accordance with this aspect of the invention are pre-printed labels having adhesive on a back surface thereof, and are able to be peeled from a protective paper until used by way of attachment to conventional jumper cables.

The provision of such safety labels will greatly facilitate the jump-starting of batteries, and in particular vehicle batteries, making jump-starting of a dead, depleted or deficient battery easier and safer.

In accordance with another aspect of the invention, a process is provided, wherein instructional means, such as safety labels, for jump-starting a battery are attached to conventional jumper cables. Preferably, in accordance with this aspect of the invention, the labels are attached ahead of time, before jump-starting is required, and a separate label for each instructional step is attached closely adjacent the end of a jumper cable near the clamping end thereof to be used for or during a particular instructional step. Attaching the labels prior to jump-starting allows this aspect of the invention to be performed at a time when the person performing the process isn't stressed or in a hurry with the prospect of having to attach the labels under adverse or emergency circumstances. Also, preferably, a summary label integrating all of the steps is attached to the jumper cables in accordance with this aspect of the invention. Preferably, the steps of the process of this aspect of the invention are accomplished by peeling a pre-printed instructional safety label from a backing, the safety label having a back or inside adhesive surface, and wrapping the label around the jumper-cable, sticking the adhesive surface of the label to the jumper cable and preferably to another adhesive portion of the same surface, back-to-back, doubling the label back on itself in much the same way one would wrap an airline luggage tag to a suitcase handle.

In accordance with still another aspect of the invention, jumper-cables are provided including instructional safety labels of the type described in accordance with other aspects of the invention.

In accordance with yet another aspect of the invention, a process is provided wherein a person performs jump-starting of a battery following instructional labels of the type set forth in accordance with other aspects of the invention. In accordance with this aspect of the invention, the person performing jump-starting of a battery would read or otherwise consult the labels attached to the particular part of the jumper cable to be used for a given step of the process of jump-starting a battery. Preferably, in accordance with this aspect of the invention, the person performing the process would also read or consult a summary instructional label attached or otherwise affixed to the jumper cables themselves.

In accordance with still another aspect of the invention, joining means, such as cable ties, are provided, together with cable instructional labels and/or the rest of the safety system, the cable ties for securing a plurality of jumper cables, preferably two, to each other in such a way as to have red-handled jumper cable clamps near black-handled jumper cable clamps. This aspect of the invention further ensures and reinforces that the safe and correct order of steps and proper location of jumper cables upon clamping to batteries is followed to alleviate the undesirable condition that some jumper cables come with two separate and unattached cables.

In accordance with another aspect of the invention, a bag is provided for holding jumper cables modified in accordance with the present invention. The bag in accordance with this aspect of the invention preferably has safety instructions printed thereon and is constructed of a durable material, such as vinyl, leather, other synthetic material, or the like, such that the bag may be placed over the dead battery after attaching a jumper cable clamp to it to minimize the possibility of injury in the event of explosion of the battery upon jump-starting. The size of the bag is dictated by the minimum size required to store a particular set of jumper cables and still be large enough to adequately cover the top surface of the battery to be jump-started.

The subject matter of the present invention is particularly pointed out and distinctly claimed in the concluding portion of this specification. However, both the organization and method of operation of the invention, together with further advantages thereof, may best be understood by reference to the following description taken in connection with accompanying drawings wherein like reference characters refer to like elements.

DETAILED DESCRIPTION

Figure 1A:
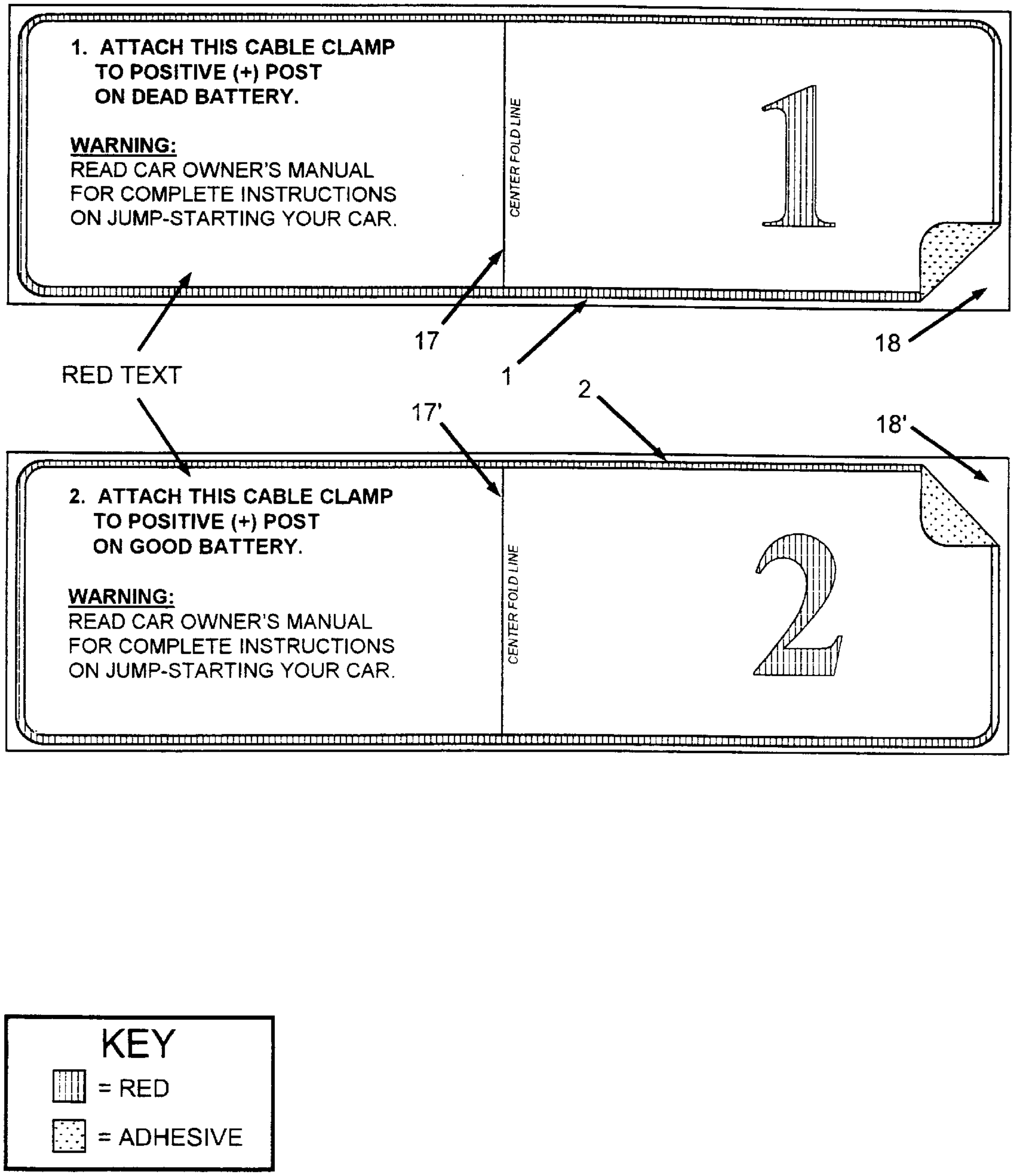
FIG. 1A shows instructional safety labels in accordance with the present invention.

Referring now to the figures, instructional safety labels 1, 2, 3, 4 and a summary instruction label 5 are provided to be adapted for ready attachment to conventional jumper cables 12. As can be seen from FIG. 1A, labels 1 and 2, corresponding with steps one and two of the process for jump starting a car, are preferably color-coded red to correspond with, illustrate, and suggest attachment of the clamp 20, associated with label 1 to the positive terminal 22 of first a dead battery 14 (step 1), and then clamp 30, associated with label 2, to the positive terminal 24 of a good, fully functional, battery 16 (step 2).

In a preferred embodiment of the invention, one half of Label 1 is pre-printed with bright red text on a white background, and reads as follows:

1. ATTACH THIS CABLE CLAMP TO POSITIVE (+) POST ON DEAD BATTERY.

WARNING: READ OWNER'S MANUAL FOR COMPLETE INSTRUCTIONS ON JUMP-STARTING YOUR CAR.

The red text of label 1 corresponds with the red handle or clamp 20 of the jumper cable and the red (hot) terminal 22 of the dead battery 14 to reinforce correct placement of the label and clamp when jump-starting.

A center fold-line 17 is provided between the two halves of the label, and the other half of label 1 simply has a large, red number 1, indicating step number 1, corresponding with the first step, as indicated above, of jump-starting dead battery 14.

As with all the labels, label 1 has an adhesive backing and may be easily peeled from paper 18 on which it is conveniently stored prior to use and applied to or near the appropriate handle or clamp 20 of the jumper cable 12 for attachment or clamping to the positive terminal 22 of the dead battery 14 to be jump-started. Attachment to the jumper cables 12 is accomplished in much the same fashion as one would attach an airline luggage tag to a suitcase handle. Preferably, attachment of the labels 1, 2, 3, 4, 5 are accomplished at a time prior to the time when the jumper cables are actually needed to jump-start a dead battery, to allow attachment of the label under non-stressful circumstances to ensure the labels are appropriately attached. Instructions are provided below describing the process in further detail for attaching cable instructional labels to jumper cables.

In accordance with a preferred embodiment of the invention, one half of label 2 is pre-printed with bright red text on a white background, and reads as follows:

2. ATTACH THIS CABLE CLAMP TO POSITIVE (+) POST ON GOOD BATTERY.

WARNING: READ OWNER'S MANUAL FOR COMPLETE INSTRUCTIONS ON JUMP-STARTING YOUR CAR.

The red text of label 2 corresponds with the red handle 30 of the jumper cable 12 and the red (hot) terminal 24 of the good battery 16 to reinforce correct placement of the label and clamp when jump-starting.

A center fold-line 17' is provided between the two halves of the label, and the other half of label 2 simply has a large, red number 2, indicating step number 2, corresponding with the second step, as indicated above, of jump-starting dead battery 14.

Similar to label 1, label 2 preferably has an adhesive backing and may be easily peeled from paper 18' on which it is stored prior to use and applied to or near the appropriate handle or clamp 30 of the jumper cable 12 for attachment or clamping to the positive terminal 24 of the good battery 16 used to jump-start the dead battery 14. Attachment of label 2 to the jumper cables 12 is accomplished in similar fashion as described in connection with label 1.

Figure 1B:
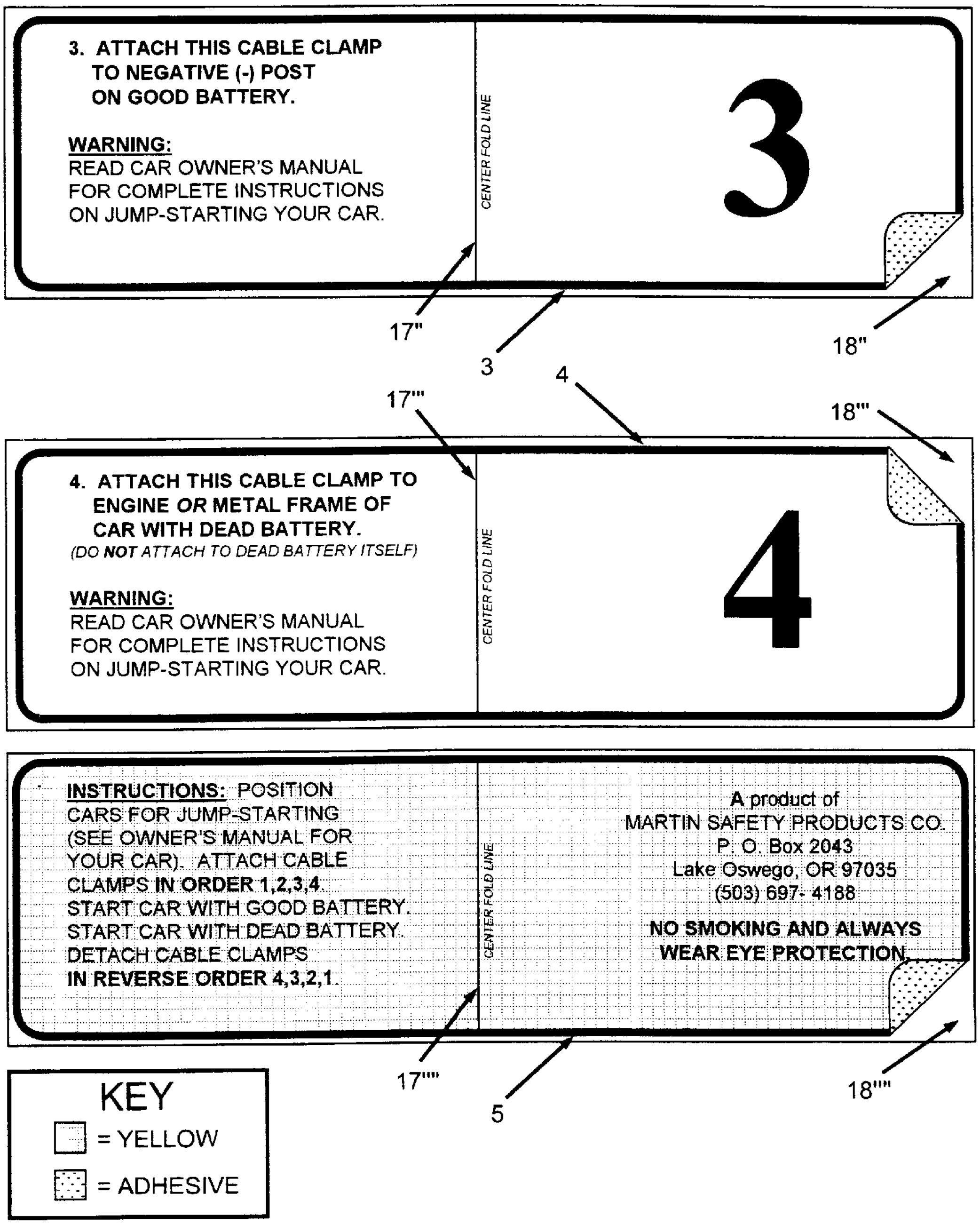
FIG. 1B shows instructional safety labels in accordance with the present invention.

As can be seen from FIG. 1B, labels 3 and 4 corresponding with steps three and four of the process for jump-starting a car, are preferably color-coded black to correspond with, illustrate, and suggest clamping of the associated clamps 40, 50 to their proper locations as further set forth hereafter.

In accordance with a preferred embodiment of the invention, one half of label 3 is pre-printed with black text on a white background, and reads as follows:

3. ATTACH THIS CABLE CLAMP TO NEGATIVE (–) POST ON GOOD BATTERY.

WARNING: READ OWNER'S MANUAL FOR COMPLETE INSTRUCTIONS ON JUMP-STARTING YOUR CAR.

The black text of label 3 corresponds with the black handle or clamp 40 of the jumper cable 12 and the black (negative or ground) terminal 41 of the good battery 16 to reinforce correct placement of the label and clamp when jump-starting.

A center fold-line 17" is provided between the two halves of the label, and the other half of label 3 simply has a large, black number 3, indicating step number 3, corresponding with the third step, as indicated above, of jump-starting dead battery 14.

Similar to labels 1 and 2, label 3 preferably has an adhesive backing and may be easily peeled from paper 18" on which it is stored prior to use and applied to or near the appropriate handle or clamp 40 of the jumper cable 12 for attachment or clamping to the negative terminal 41 of the good battery 16 to be used in jump-starting bad battery 14. Attachment of label 3 to the jumper cables 12 is accomplished in similar fashion as described in connection with labels 1 and 2.

In accordance with a preferred embodiment of the invention, one half of label 4 is pre-printed with black text on a white background, and reads as follows:

4. ATTACH THIS CABLE CLAMP TO ENGINE OR METAL FRAME OF CAR WITH DEAD BATTERY. (DO NOT ATTACH TO DEAD BATTERY ITSELF)

WARNING: READ OWNER'S MANUAL FOR COMPLETE INSTRUCTIONS ON JUMP-STARTING YOUR CAR.

The black text of label 4 corresponds with the black handle or clamp 50 of the jumper cable 12 to reinforce correct placement of the label and clamp when jump-starting. This text is important and teaches not to attach clamp 50 to the dead battery itself as it is here that sparks from attaching the clamp (a common occurrence) can spark battery gases and cause an explosion.

A center fold-line 17'" is provided between the two halves of the label, and the other half of label 4 simply has a large, black number 4, indicating step number 4, corresponding with the fourth step, as indicated above, of jump-starting dead battery 14.

Similar to labels 1, 2 and 3, label 4 preferably has an adhesive backing and may be easily peeled from paper 18'" on which it is stored prior to use and applied to or near the appropriate handle or clamp 50 of the jumper cable 12 for attachment or clamping to the engine 54 or metal frame 52 of the car having the bad battery 14 to be jump-started or other suitable, non-moving, grounding location on the car having the bad battery. Attachment of label 4 to the jumper cables 12 is accomplished in similar fashion as described in connection with labels 1, 2 and 3 above.

As can be seen from FIG. 1B, label 5 includes summary instructions for the process for jump-starting a dead battery, and is preferably a bright, eye-catching color, such as bright yellow, to suggest the importance of this label.

In a preferred embodiment of the invention, one half of summary instruction label 5, is preprinted in black and reads as follows:

INSTRUCTIONS: POSITION CARS FOR JUMP-STARTING (SEE OWNERS MANUAL FOR YOUR CAR). ATTACH CABLE CLAMPS IN ORDER 1,2, 3,4. START CAR WITH GOOD BATTERY. START CAR WITH DEAD BATTERY. DETACH CABLE CLAMPS IN REVERSE ORDER 4,3,2,1.

The other half of label 5 is preprinted in black and can have additional product source information, as well as other safety instructions, such as: NO SMOKING AND ALWAYS WEAR EYE PROTECTION.

Similar to labels 1, 2, 3 and 4, label 5 preferably has an adhesive backing and may be easily peeled from the paper 18"" on which it is stored prior to use and applied near the center of the jumper cable 12 for use in reading general instructions for jump-starting a dead battery with jumper cables in accordance with the present invention. Attachment of label 5 to the jumper cables 12 is accomplished in similar fashion as described in connection with labels 1, 2, 3 and 4 above.

Figure 5A:
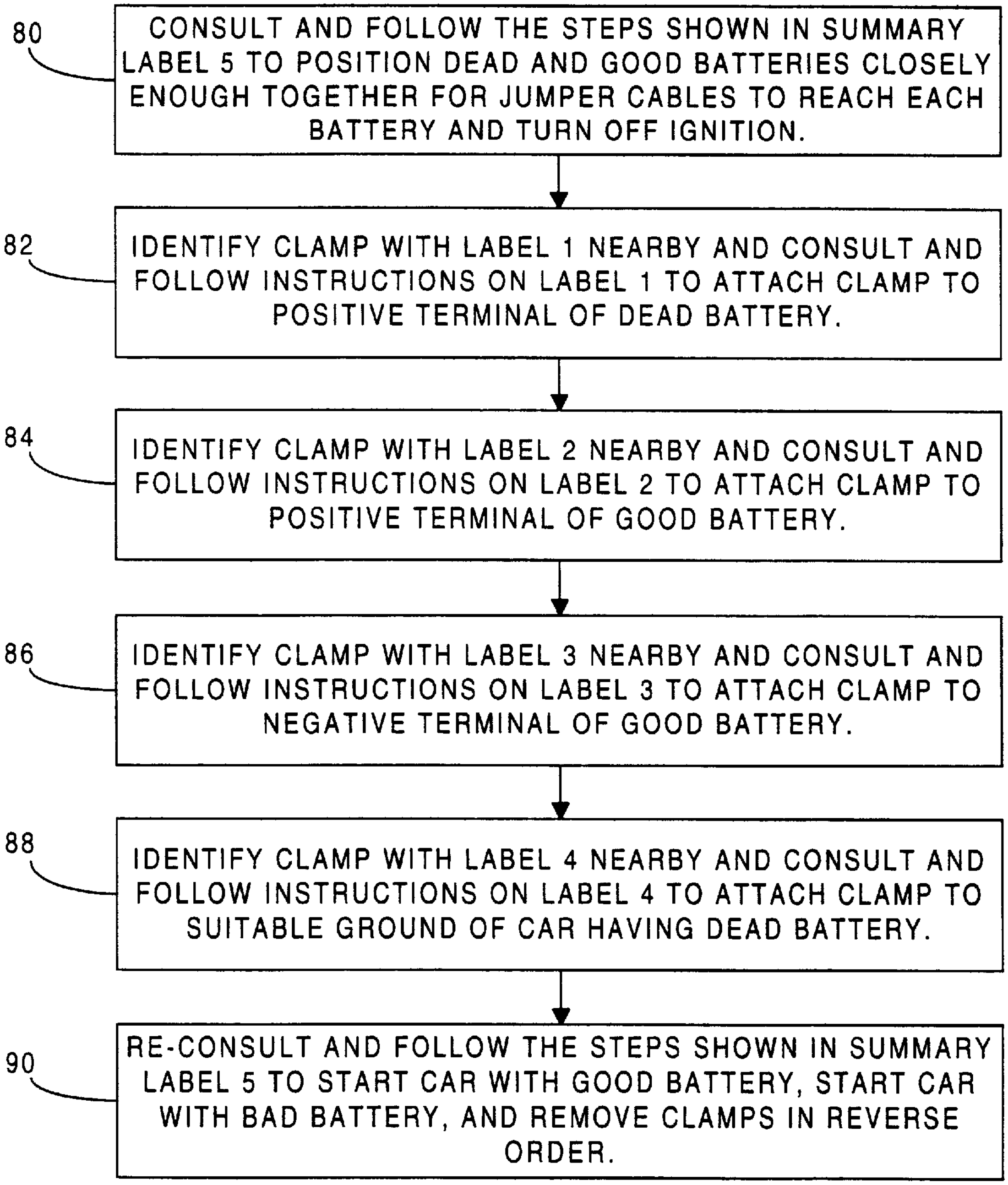
FIG. 5A is a flow diagram showing the steps for jump-starting a dead battery in accordance with an aspect of the present invention.
Figure 5B:
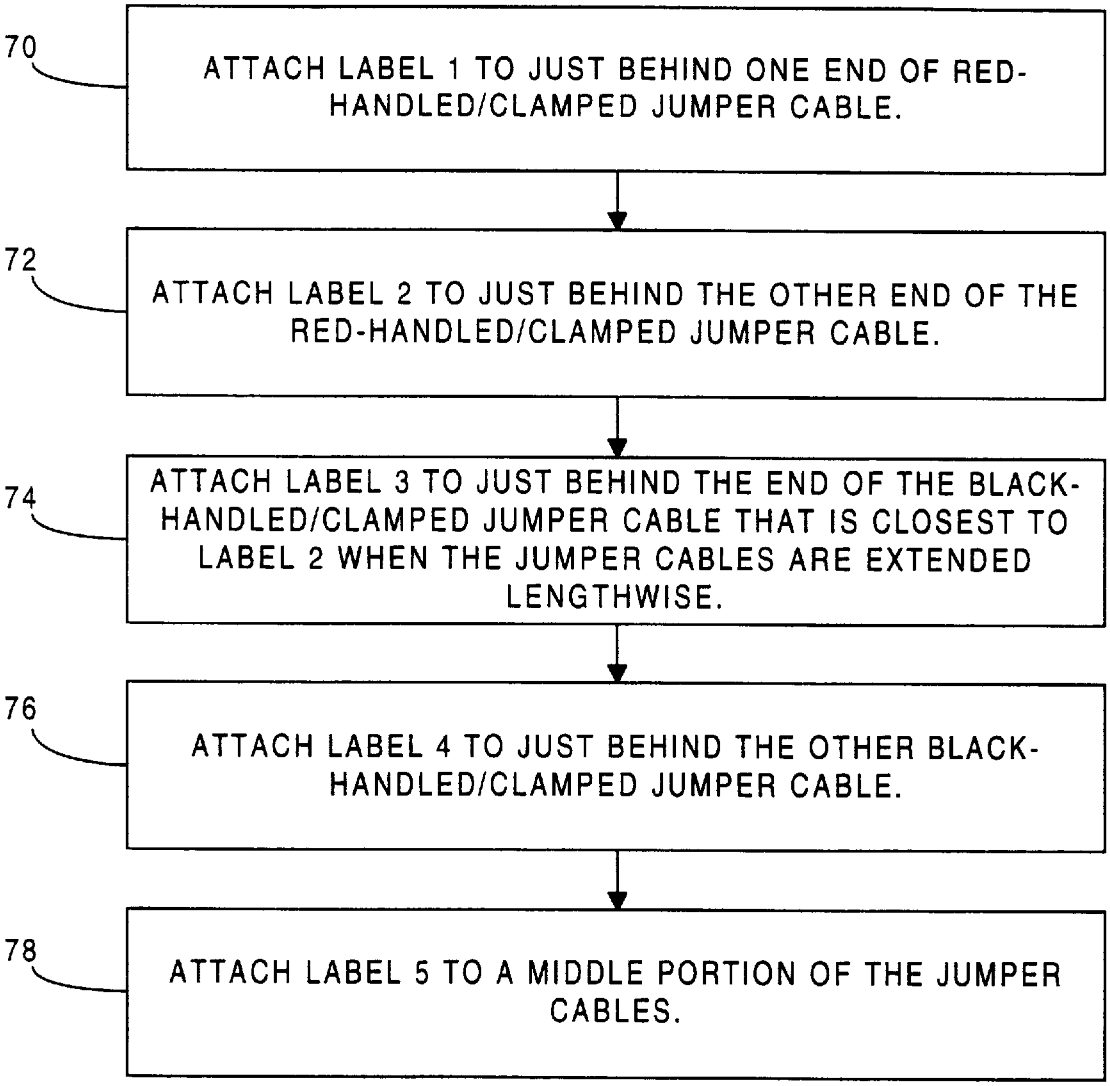
FIG. 5B is a flow diagram showing the steps for attaching instructional labels of the present invention to conventional jumper cables in accordance with the present invention.

In accordance with another aspect of the invention, the process for attaching the instructional labels to jumper cables comprises the following steps (as shown in FIG. 5B, reference numerals 70, 72, 74, 76, 78):

1. As shown at 70, attach label 1 to one end 20 of the red-handled/clamped cable. Attach it just behind the clamp 20, not directly to the clamp.
2. As shown at 72, attach label 2 to the other end 30 of the same red-handled/clamped cable, just behind the other red-handled clamp 30.
3. As shown at 74, attach label 3 to the end 40 of the black-handled/clamped cable which is near label 2.
4. As shown at 76, attach label 4 to the other end 50 of the same black-handled/clamped cable, just behind the other black-handled clamp 50.
5. As shown at 78, attach the instruction label 5 to the middle of the cables 12. Additional instructions may be provided with the labels of the invention, such as:

ALWAYS USE THE CABLE ENDS WITH LABEL 1 AND LABEL 4 ON THE CAR WITH THE DEAD BATTERY. ALWAYS USE THE CABLE ENDS WITH LABEL 2 AND LABEL 3 ON THE CAR WITH THE GOOD BATTERY.

TO USE CABLE LABELS WHEN JUMP STARTING YOUR CAR:

IMPORTANT: NO SMOKING AND ALWAYS WEAR EYE PROTECTION WHILE ATTACHING CABLES, JUMP-STARTING YOUR CAR AND DETACHING CABLES. THE FOLLOWING INSTRUCTIONS ARE INTENDED TO BE USED ONLY WHERE BOTH VEHICLES HAVE NEGATIVE GROUND ELECTRICAL SYSTEMS. THE VOLTAGE OF BOTH BATTERIES SHOULD ALWAYS BE THE SAME—12 VOLT, FOR EXAMPLE.

A. CAREFULLY READ THE JUMP-STARTING INSTRUCTIONS IN YOUR CAR OWNER'S MANUAL. IF THEY ARE NOT FOLLOWED CORRECTLY, PERSONAL INJURY OR DAMAGE TO CAR OR BATTERY COULD RESULT.

B. POSITION CARS CORRECTLY FOR JUMP-STARTING, NOT TOUCHING EACH OTHER AND BOTH IGNITIONS TURNED OFF.

C. ATTACH JUMPER CABLES ACCORDING TO THE ORDER 1,2,3,4 (SEE LABELS). BE SURE TO FOLLOW THE INSTRUCTIONS ON EACH LABEL, INCLUDING THE SUMMARY INSTRUCTION LABEL ATTACHED TO THE CENTER OF YOUR JUMPER CABLES.

D. START CAR WITH GOOD BATTERY.

E. START CAR WITH DEAD BATTERY.

F. DETACH JUMPER CABLES CLAMPS IN REVERSE ORDER 4,3,2,1 (SEE LABELS).

Provision of additional instructions in this fashion in connection with the labels of the present invention further simplifies the process of using the present invention to safely jump-start a dead battery.

While a preferred embodiment of the invention has been described and shown, it will be appreciated by those skilled in the art that other wording for the instructions or directions, or other means of attaching the labels to the jumper cables may be employed. For example, strings through reinforced eyelets in tags may likewise be used to attach the labels to the jumper cables. Moreover, it will be appreciated by those of ordinary skill in the art that other color schemes or using lettering instead of numbering of steps may be implemented without departing from the scope and spirit of the invention. Also, it will be appreciated that various combinations of the aforementioned aspects of the invention may be made without departing from the scope of the invention.

Referring now to FIG. 5A, in accordance with another aspect of the invention, a process is provided for jump-starting a dead battery 14 wherein a person performs jump-starting of the battery following instructional labels 1,2,3,4 and 5 shown and described above in accordance with other aspects of the invention. In accordance with this aspect of the invention, the person performing jump-starting of a battery would read and/or consult the labels attached to the particular part of the jumper cable to be used for a given step of the process of jump-starting a battery, and preferably would also read and/or consult a summary instructional label attached or otherwise affixed to the jumper cables themselves.

Thus, to jump-start a battery in accordance with this aspect of the invention, the person performing this process would, as shown at 80, consult summary label 5 and position the batteries close to each other, as by parking their respective cars closely to each other but without touching each other, turn off the ignitions of both cars, and retrieve the jumper cables 12 having labels 1–5 attached thereto. Then, preferably, the person performing the process would perform the following steps.

Consult and follow any remaining steps to be performed as shown in summary label 5 (See 80 of FIG. 5A).

As shown at 82, identify the clamp 20 of jumper cable 12 with label 1 thereby, and following the instructions read on label 1, clamp the appropriate clamp 20 to the positive terminal 22 of the dead battery 14.

As shown at 84, identify the clamp 30 of jumper cable 12 with label 2 thereby, and following the instructions read on label 2, clamp the appropriate clamp 30 to the positive terminal 24 of the good battery 16.

As shown at 86, identify the clamp 40 of jumper cable 12 with label 3 thereon, and following the instructions read on label 3, clamp the appropriate clamp 40 to the negative terminal 41 of the good battery 16.

As shown at 88, identify the clamp 50 of jumper cable 12 with label 4 thereon, and following the instructions read on label 4, clamp the appropriate clamp 50 to the frame 52 or engine 54 of the car with the dead battery 14.

As shown at 90, consult and follow the remaining steps shown in the summary label 5.

Figure 2:
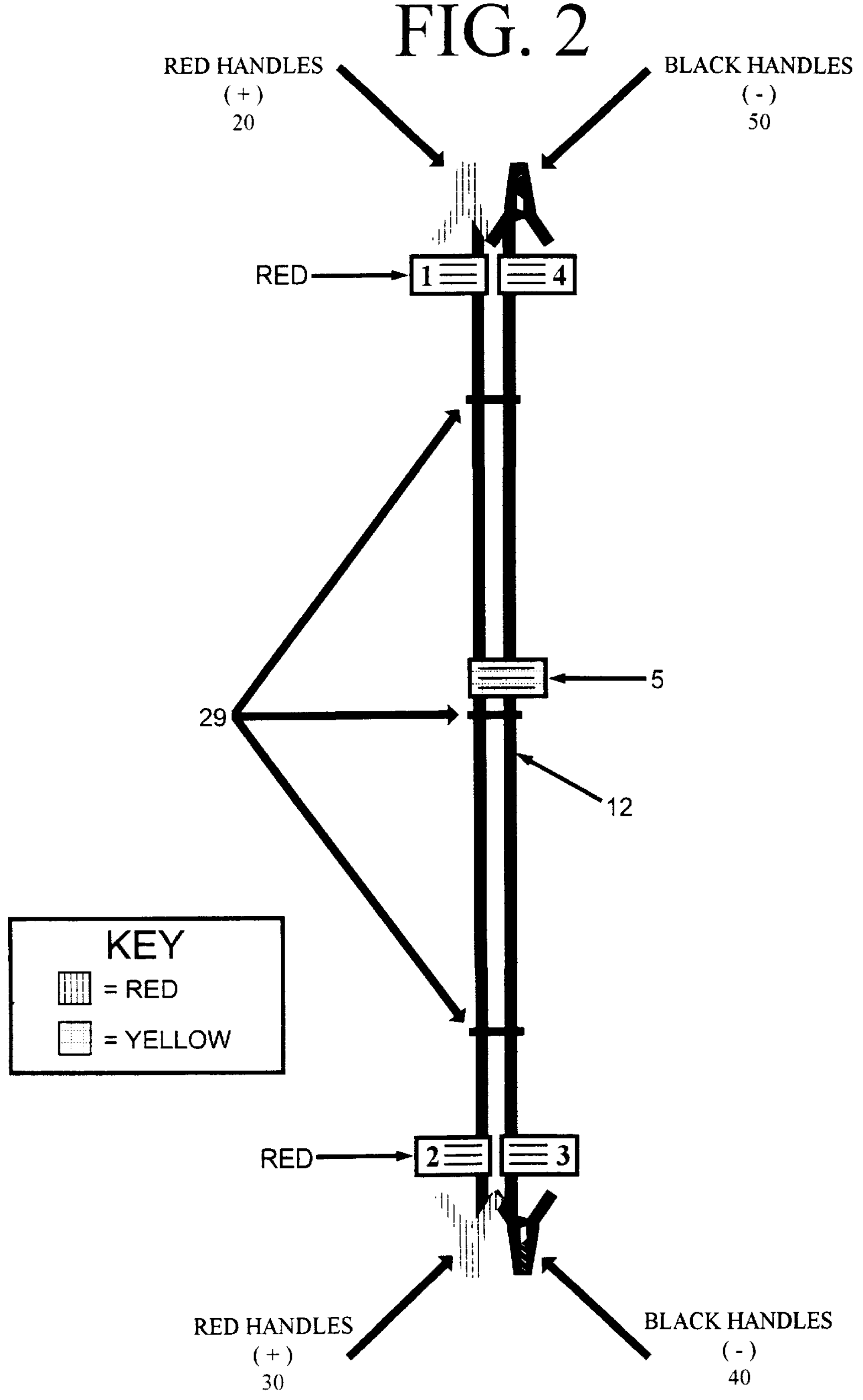
FIG. 2 illustrates a set of jumper cables with a depiction of the instructional safety labels of FIG. 1 attached thereto and cable ties attached thereto in accordance with the invention.

As shown in FIG. 2, means of joining jumper cables which are not otherwise joined are provided. Preferably, this is accomplished with commonly available plastic cable ties 29. To attach two separate jumper cables 12 with ties 29, simply lay the jumper cables adjacent and parallel to each other, with red-handled clamp 20 and black-handled clamp 50 near each other and with red-handled clamp 30 near black-handled clamp 40, and attach the jumpercables with cable ties 29 as shown: preferably with one cable tie in the center and one cable tie on either side of the center cable a suitable distance (e.g., around 18 inches) to ensure that the red and black-handled clamps remain near each other during use of the jumper cables. This aspect of the invention provides greater safety during jump-starting a dead battery inasmuch as it reinforces the correct positioning of the jumper cables upon clamping them to the batteries and frame of the car with the dead battery. Otherwise, it would be possible, or more likely, that one could cross the jumper cables or attach them otherwise incorrectly. This, in turn could result in serious injury to those performing the jump-starting process, or bystanders, or cause damage to the vehicles.

Figure 3:
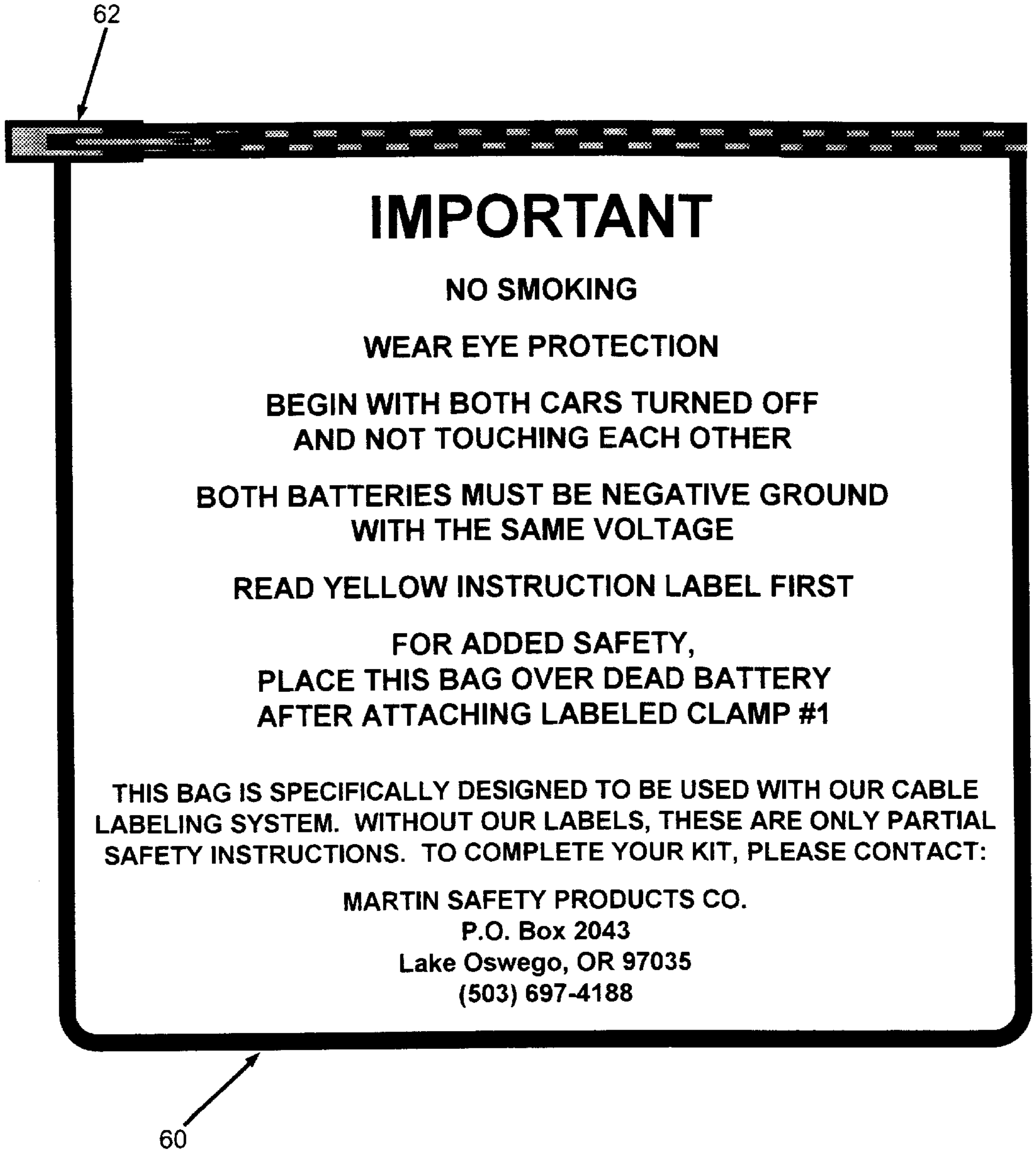
FIG. 3 illustrates a jumper-cable bag with safety instructions thereon in accordance with the invention.

As shown in FIG. 3, in accordance with another aspect of the invention, a bag or pocket 60 is provided for holding jumper cables 12 modified in accordance with the present invention. The pocket 60 may be suitably enclosed with a zipper 62 or other means of enclosure, including snaps, buttons, or other engagement mechanism.

Moreover, the bag 60 in accordance with this aspect of the invention has safety instructions printed thereon and is constructed of a durable material, such as vinyl, leather, other synthetic material, or the like, such that the bag may be placed over the dead battery after attaching a jumper cable end to it to minimize the possibility of injury in the event of explosion of the battery upon jump-starting.

Figure 4:
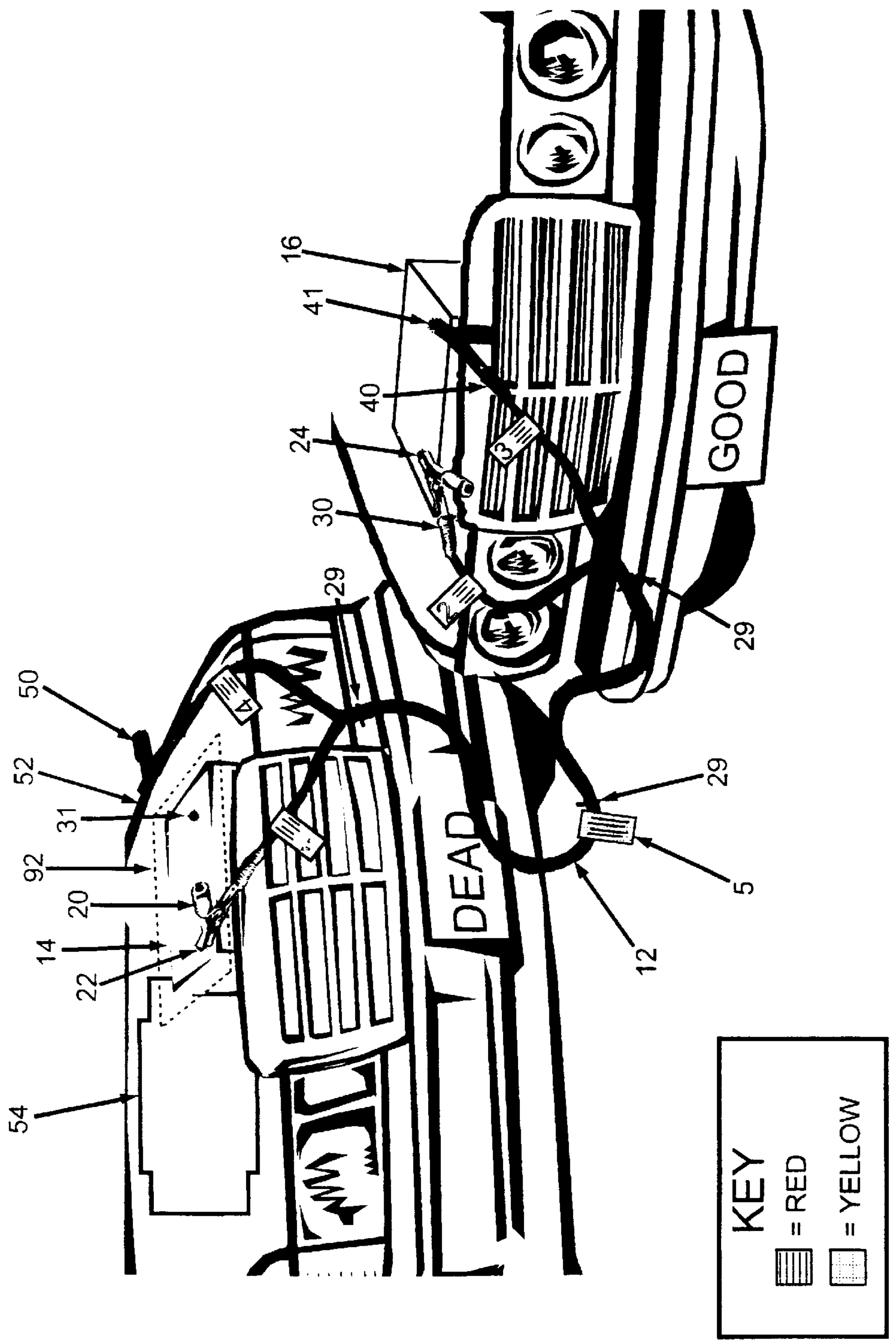
FIG. 4 illustrates two car batteries having jumper cables with instructional safety labels placed thereon in accordance with the present invention.

Preferably, bag 60 is placed over battery 14 (as shown in phantom at 92 of FIG. 4) immediately after the first red-handled jumper cable clamp 20 is attached according to step 1, to further reinforce that another jumper cable clamp (e.g., clamp 50) is not to be attached to negative terminal 31 of the dead battery 14–rather to the frame 52 of the vehicle or a nonmoving part of the engine 54. Thus, in accordance with this aspect of the invention, the steps of the process of the invention for starting a dead battery 14 would include the step of laying the bag 60 over the battery after clamping clamp 50 to the positive terminal of the dead battery.

Safety instructions on the bag may, but are not limited to, include the following:

IMPORTANT

NO SMOKING

WEAR EYE PROTECTION

BEGIN WITH BOTH CARS TURNED OFF AND NOT TOUCHING EACH OTHER

BOTH BATTERIES MUST BE NEGATIVE GROUND WITH THE SAME VOLTAGE

READ YELLOW INSTRUCTION LABEL FIRST

FOR ADDED SAFETY, PLACE THIS BAG OVER DEAD BATTERY AFTER ATTACHING LABELED CLAMP 1

THIS BAG IS SPECIFICALLY DESIGNED TO BE USED WITH THE ENCLOSED BOOSTER CABLE LABELING SYSTEM. WITHOUT THESE LABELS, THESE ARE ONLY PARTIAL SAFETY INSTRUCTIONS. TO COMPLETE YOUR KIT, PLEASE CONTACT:

MARTIN SAFETY PRODUCTS CO.

P.O. BOX 2043

LAKE OSWEGO, OR 97035

(503) 697-4188

It is understood that various other modifications and combinations will be apparent to and can be readily made by those skilled in the art without departing from the scope and spirit of this invention. Accordingly, it is not intended that the scope of the claims appended hereto be limited to the description as set forth herein, but rather that the claims be construed as encompassing all patentable features that would be treated as equivalents thereof by those skilled in the art to which this invention pertains.

We claim:

1. A process for jump-starting a car having a dead battery with the aid of a car having a good battery, comprising:

consulting an instructional label attached near a first clamp of battery jumper cables and following the instructions on said instructional label to clamp the first clamp on a battery terminal;

placing a protective material over the dead battery;

consulting another instructional label attached near a second clamp of the battery jumper cables and following the instructions on said another instructional label to clamp the second clamp on another battery terminal;

consulting still another instructional label near a third clamp of the battery jumper cables and following the instructions on said still another instructional label to clamp the third clamp on still another battery terminal;

consulting yet another instructional label attached near a fourth clamp of the battery jumper cables and following the instructions on said yet another instructional label to clamp the fourth clamp on a suitably grounded object of the car having a dead battery;

starting the car with the good battery; and starting the car with the dead battery, wherein the protective material comprises a protective bag for storing the jumper cables and placement over the dead battery to be jump-started, the bag comprising: a pocket made of a flexible, durable material for storing the jumper cables, means for closing the pocket, and safety instructions printed on the pocket pertaining to the jump-staring of a dead battery and placement of the bag over the dead battery to be jump-started.

2. A battery jump-start safety system comprising:

a plurality of instructional labels adapted for attachment on jumper cables, ones of said labels being designed to be positioned adjacent that portion of the jumper cables to be used in accordance with said ones of said labels adjacent said portion during the process of jump-starting a dead battery; and a battery cover member for placement over the dead battery to minimize the possibility of injury in the event of explosion of the dead battery, wherein said battery cover member further functions as a jumper cable storage member.

3. A battery jump-start safety system comprising:

a plurality of instructional labels adapted for attachment on jumper cables, ones of said labels being designed to be positioned adjacent that portion of the jumper cables to be used in accordance with said ones of said labels adjacent said portion during the process of jump-starting a dead battery; and a battery cover member for placement over the dead battery to minimize the possibility of injury in the event of explosion of the dead battery, wherein said battery cover member further functions as a jumper cable storage bag.

4. A battery jump-start safety system comprising:

a battery safety cover, for placement over the dead battery during a time of a process of jump-starting a battery, to minimize the possibility of injury in the event of explosion of the dead battery, said safety cover having safety instructions printed thereon relating to the process for jump-starting the dead battery, wherein said battery safety cover includes a jumper cable storage bag, for providing a storage place for the jumper cables during a time other than during a process of jump-starting a battery.

5. A battery jump-start safety system comprising:

a set of jumper cables;

a plurality of instructional labels attached on said jumper cables, said labels being positioned adjacent portions of said jumper cables to be used in accordance with said labels adjacent said portion during the process of jump-starting a dead battery; and a battery cover member for placement over the dead battery to minimize the possibility of injury in the event of explosion of the dead battery during the process of jump-starting the dead battery, wherein said battery cover member further functions as a storage bag for said set of jumper cables.

* * * * *